United States Patent [19]

Rowley

[11] Patent Number: 4,803,033
[45] Date of Patent: Feb. 7, 1989

[54] METHOD OF FORMING A FLANGE OR BELLOWS IN A PLASTIC TUB

[76] Inventor: William W. Rowley, 11524 Wilbert Rd., Chardon, Ohio 44024

[21] Appl. No.: 38,723

[22] Filed: Apr. 15, 1987

[51] Int. Cl.$^4$ .............................................. B29C 53/08
[52] U.S. Cl. ................................... 264/339; 425/393; 425/812
[58] Field of Search ............... 264/339, 322; 425/393, 425/392

[56] References Cited

U.S. PATENT DOCUMENTS

| | | | |
|---|---|---|---|
| 412,389 | 10/1889 | Isherwood. | |
| 2,347,101 | 4/1944 | Harding | 264/339 |
| 2,446,281 | 8/1948 | Harding | 425/393 |
| 3,194,041 | 7/1965 | Johnson | 425/392 |
| 3,339,004 | 8/1967 | Nardone | 264/293 |
| 3,370,118 | 2/1968 | Love | 264/325 |
| 3,445,552 | 5/1969 | Aungst et al. | 264/322 |
| 3,453,359 | 7/1969 | Clement et al. | 264/322 |
| 3,457,762 | 7/1969 | DeGain | 72/367 |
| 3,575,033 | 4/1971 | Meyer | 72/317 |
| 3,823,216 | 7/1974 | Petzetakis. | |
| 4,108,589 | 8/1978 | Bunch | 425/393 |
| 4,316,870 | 2/1982 | Rowley | 425/393 |
| 4,354,495 | 10/1982 | Bodicky | 264/322 |
| 4,406,852 | 9/1983 | Riegel | 264/322 |
| 4,606,214 | 8/1986 | Miyazaki | 72/318 |
| 4,687,432 | 8/1987 | Cross et al. | 425/392 |

Primary Examiner—James Lowe
Attorney, Agent, or Firm—Renner, Otto, Boisselle & Sklar

[57] ABSTRACT

The invention concerns a method of forming a flange or bellows in a plastic tube. The tube is preheated at a precise area and gripping dies are used to compress the heated area. Upon compression, the heated area is forced to bulge out and fold to form the flange or bellows. A mandrel inserted into the tube prior to compression ensures that the tube bulges outwardly. The invention may be used to form a variety of flanges, rims or bellows on plastic tubing. It is particularly useful in forming retaining rims on polyethylene tubing used for gas tank vents. Exposure to gasoline may cause such tubes to swell or bend. With a retaining rim formed in accordance with the present invention such swelling or bending can readily be accommodated.

17 Claims, 2 Drawing Sheets

METHOD OF FORMING A FLANGE OR BELLOWS IN A PLASTIC TUB

The invention pertains to the art of plastic tube molding and in particular to a method of forming flanges, rims or bellows in a plastic tube without blowing out or molding the tube.

BACKGROUND OF THE INVENTION

The formation of flanges or bellows in plastic tubes is well known. Plastic flanged tubes are used in a variety of applications including gas tank vents. Heretofore, the flanges or bellows in plastic tubes have been formed either by blowing out a portion of the tube from inside or by forming the flange in a mold.

In the blowing out method, a plastic tube is preheated at precise points. Then pressure is applied at the inside wall of the tube at the preheated points to cause the wall to stretch and bulge and eventually form a flange.

One consequence of this method is that the end of the flange thus formed is very thin walled. Its thickness is less than that of the original tube wall because it only comprises a stretched portion. Thus, the flange is a weak point in the tube structure.

Gas tank vents of polyethylene tubing are formed with retaining flanges or rims by which they are mounted. Such vents are subject to swelling or bending upon exposure to gasoline. If the rims won't accommodate such bending or swelling, they are subject to failure.

SUMMARY OF THE INVENTION

The invention concerns a method of forming any number of flanges or bellows in a plastic tube without resorting to blowing out the inside walls or preforming tube halves in molds. Instead, flanges or bellows are formed by compressing a tube at precise points to create folds in the tube.

A mandrel is inserted into a tube to provide a solid structure about which the flanged tube may be formed. The tube and mandrel are inserted through several gripping dies which are initially spaced apart. The tube is then heated at the points between the dies to soften the walls. Once the plastic walls are soft, the gripping dies are moved toward each other in relative motion causing the tube portions therebetween to compress and bulge radially outward. Upon further compression the bulges form folds. The amount of compression of any compressed tube portion and the heat employed determined whether a flange or bellows is thereby formed.

In any event, the resulting radial ends of the bellows or flanges have a thickness equal to or greater than the thickness of the original tube wall. Additionally, tube portions are not joined together and therefore no seams are formed in the tube. Thus, the resulting flanged or bellowed tube is devoid of any inherent weak spots created by the flange or bellows formation.

Therefore, an aspect of this invention is a method of forming a flange or a bellows in a plastic tube without blowing out the inside walls.

Another aspect of the invention is a method of forming a flange or a bellows in a plastic tube without need to preform the flange or bellows in a mold.

A further apsect of the invention is a method of forming a flange or bellows in a plastic tube wherein the thickness of the end of the flange or bellows is equal to or greater than the original tube wall.

In a gas tank vent, a rim or flange formed in accordance with the present invention provides a double wall thickness rim wherein the walls of the rim are not joined to each other and may be actually spaced. This permits the tube to hinge or bend at the rim accommodating swelling due to exposure to the gasoline.

These and other aspects, advantages, features and objects of the invention will become more apparent from the following description.

To the accomplishment of the foregoing and related ends the invention, then, comprises the features hereinafter fully described in the specification and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENT

Figure 1:
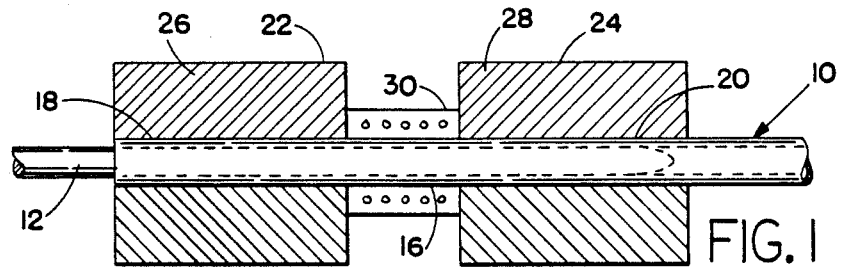
FIG. 1 is a cross-sectional view of a tube in which a flange or bellows is to be formed in accordance with the invention and a cross-sectional view of the gripping dies, heat source and mandrel used in the preferred embodiment shown in relative locations prior to the formation of the flange or bellows.
Figure 2:
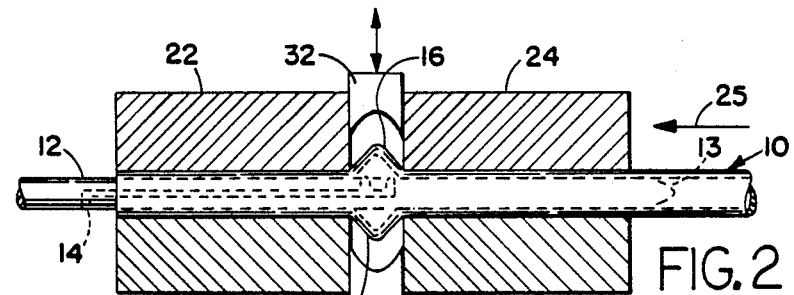
FIG. 2 is a cross-sectional view similar to that of FIG. 1 but showing the formation of a bellows, the relative movement of the gripping dies and a spacer used to control the outside of the bellows.
Figure 3:
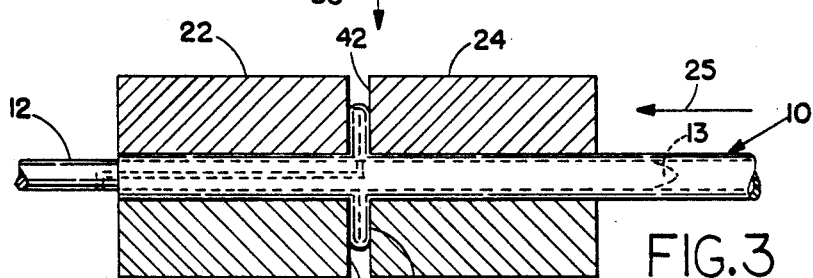
FIG. 3 is a cross-sectional view similar to that of FIG. 1 but showing a formed flange and the relative movement of the gripping dies.

With reference to FIGS. 1, 2 and 3, the preferred method practiced in accordance with the invention will be described.

In the method of FIGS. 1–3 there is provided a plastic tube 10 in which it is desired to form a flange, rim, or bellows. For the purposes of this description, a bellows is defined to mean a bellows shaped flange whether or not the bellows shaped flange is expandable or contractable.

A mandrel 12 is inserted into the tube 10 to provide a supporting surface about which the flange, rim, or bellows is to be formed. The O.D. of the mandrel is substantially equal to the I.D. of the tube. The mandrel may have a bullet nose indicated at 13 for ease of insertion. The tube, of course, may be threaded over the mandrel. With reference specifically to FIGS. 2 and 3, it is shown that the mandrel may be provided with a vent 14 which allows free flow of atmospheric air to and from the tube portion indicated generally at 16 where the flange or bellows is to be formed. This free flow of air permits an escape for air trapped under the portion 16 during compression.

With continuing reference to FIGS. 1, 2 and 3, it is shown that the tube 10 with mandrel 12 inserted therein is inserted into the cylindrical cavities 18 and 20 of gripping dies 22 and 24 respectively. The gripping dies are then closed to grip the tube 10. Gripping dies 22 and 24 have flat paralle abutting faces 26 and 28 respectively the plane of which are parallel to the axial length of the tube 10.

Initially, the gripping dies 22 and 24 are spaced apart to permit placement of heater or heat source 30 about tube portion 16. The heat source 30 is used to heat tube portion 16 and thereby soften it to a pliable state. Once the tube portion 16 is sufficiently pliable, heat source 30 is removed.

The extent of movement of the die 24 toward the die 22 may be controlled by half round spacers 32 and 34. The interior of the spacers may be shaped as illustrated to assist in formation of the tube portion 16 and to shape the exterior of the bellows 36 being formed.

The formation of a flat, solid flange 38 is depicted in FIG. 3. There a flange 38 is shown to be formed by moving gripping die 24 toward gripping die 22 as indicated by the arrow 25, and with the spacers not present. The dies 22 and 24 grip the unheated portions of the tube 10 and therefore, when die 24 is caused to move relative to die 22, the heated portion 16 is compressed between the opposed die faces 40 and 42.

In the embodiment of FIGS. 1-3 the faces 40 and 42 are perpendicular to the axis of the tube and the type of flange, rim or bellows formed is dependent on the final spacing of such faces and the amount of heat employed. In FIG. 3 with the flange 38 under pressure a solid double wall flange is formed. With slight further spacing the walls of the flange won't join. With even further spacing as in FIG. 2 a bellows of the desired configuration is formed.

As the heated tube portion 16 compresses it is forced to bulge or fold as more and more tube portion is forced to occupy the same length of space. The mandrel 12 ensures that the tube 10 does not collapse and that the tube portion 16 bulges and folds outwardly. Thus outward bulge 36 or 38 is formed. When the tube portion 16 has cooled sufficiently, the gripping dies and mold are opened to release the tube.

Figure 4:
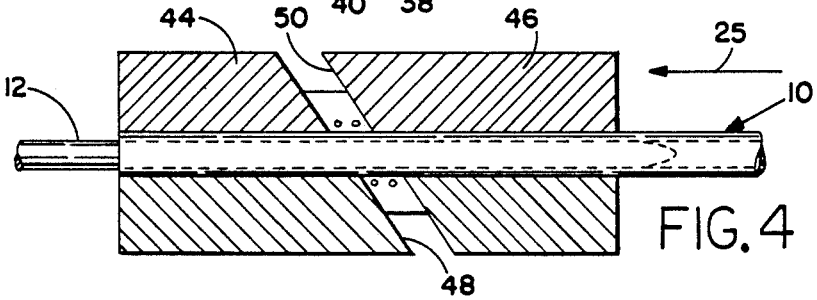
FIG. 4 is a cross-sectional view of an alternative embodiment of the invention showing gripping dies with parallel angled faces and similarly angled heat sources.

In FIG. 4 an alternative embodiment of the invention is depicted. As shown angled flanges, rims or bellows may be formed by utilizing gripping dies 44 and 46 with parallel angled faces 48 and 50 respectively. Additionally, heat source 52 has angled surfaces to fit between the angled opening created by angled faces 48 and 50. When the tube section between the dies is heated, the heat source is removed and the flange, rim or bellows is formed by moving die 46 toward die 44 in the direction of arrow 25 the desired extent.

Figure 5:
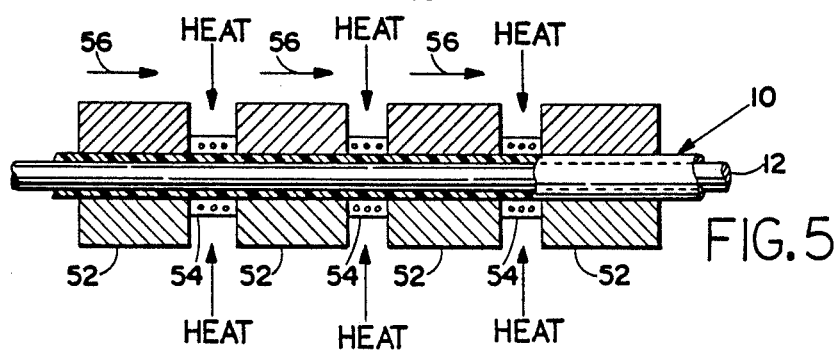
FIG. 5 is a cross-sectional view of an embodiment utilizing a plurality of gripping dies, a plastic tube and a mandrel to form a plurality of bellows or flanges.

As is readily apparent, it is possible to duplicate the methods practiced in accordance with this invention several times on the same tube. In FIG. 5 there is provided a plurality of gripping dies 52 and heat sources 54 to form a plurality of flanges at one time. Again a mandrel 12 is employed to ensure the heated wall portions fold outwardly. When the well defined wall portions are sufficiently heated the heat sources are removed. The dies are then moved to close up the spacing as indicated by the arrows 56. The tube slides over the I.D. mandrel as it is shortened. Again, depending upon the extent of heating, the axial spacing and pressure of the opposed die faces, the two walls of the bulge can stick together and become solid or not stick if sufficiently cool, and later function as a bellows. Likewise, a plurality of bellows or flanges not perpendicular to the axis of the tube could be similary formed.

Figure 6:
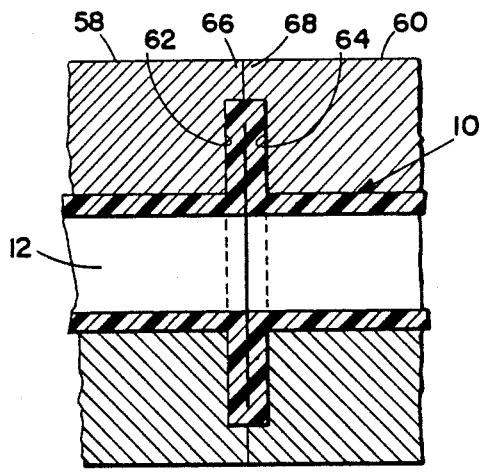
FIG. 6 is a view similar to FIG. 3 but showing the opposed end faces of the gripping dies formed with mating exterior annular ridges.

In FIG. 6 there is illustrated two gripping dies 58 and 60, the end faces 62 and 64 of which are provided with exterior annular ridges seen at 66 and 68, respectively. Such end faces ridges abut when the dies are brought together and serve to control the final spacing of the dies and thus the pressure on the formed flange or bellows and also to shape the exterior of the flange or bellows. The ridge also may serve to bit off any excess material. With the embodiment of FIG. 6, a more precise flange or bellows may be formed.

Figure 7:
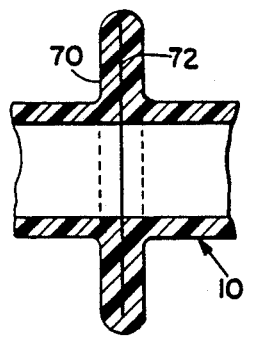
FIGS. 7 through 11 are enlarged illustrations of various flanges, rims or bellows which can be formed in accordance with the present invention.
Figure 8:
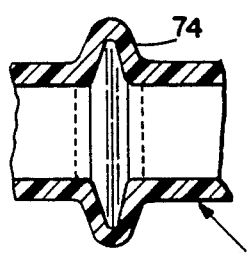
Figure 9:
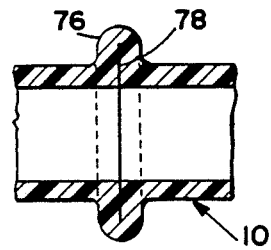
Figure 10:
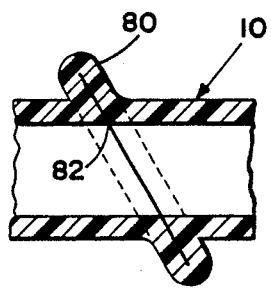
Figure 11:
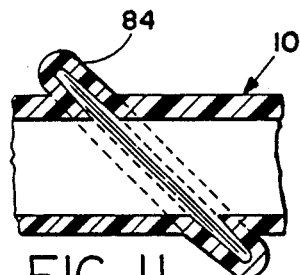

In FIG. 7 there is shown a large double wall flange 70. The walls may be bonded together as indicated at 72. In FIG. 8 there is illustrated a bellows 74. In FIG. 9 there is seen a rim or flange 76 and the walls seen at 78 need not be bonded together and may actually be slightly spaced. The tube of FIG. 9 makes an ideal gas tank vent allowing the tube to expand or flex at the flange. FIG. 10 illustrates an angled flange 80. If the walls are not bonded together at 82, the flange will permit the tube to flex or bend at the flange. FIG. 11 illustrates an angled bellows 84 permitting an even greater degree of flexure. It will be appreciated that each tube may have a plurality of such flanges, rims or bellows. Obviously the more flanges or bellows formed in the tube, the greater the degree of flexure. Such flanges or bellows permit such tubes to be more easily installed and adapted without comprising their strength and capacity.

Although the invention has been shown and described with respect to a certain preferred embodiment, it is obvious that equivalent alterations and modificatins will occur to those skilled in the art upon the reading and understanding of this specification. The present invention includes all such equivalent alterations and modifications, and is limited only by the scope of the following claims.

What is claimed is:

1. A method for forming a flange or bellows in a plastic tube comprising:
   inserting a mandrel inside a plastic tube;
   gripping said tube with at least two gripping dies, said gripping dies initially spaced apart;
   heating the tube between the two gripping dies until the wall portion of said tube between said gripping dies is foldable,
   moving said gripping dies relatively toward each other to form such flange or bellows;
   controlling the extent of movement of such gripping dies so as to avoid the interior walls of the flange or bellows from sticking to each other, and
   providing the gripping dies with opposed annular ridges which are adapted to abut when the dies are moved toward each other.

2. A method for forming a bellows in a plastic tube as set forth in claim 1 wherein said gripping dies are moved relatively toward each other so as to compress the tube wall portion therebetween.

3. A method as set forth in claim 1 wherein said gripping dies are moved relatively toward each other so as to cause the tube wall portion therebetween to compress.

4. A method as set forth in claim 3 wherein said compressing tube wall portion is caused to bulge outwardly to the extent permitted by such spacer.

5. A method as set forth in claim 1 wherein said flange or bellows extends radially from said tube at a right angle to the axial length of said tube.

6. A method as set forth in claim 1 wherein said flange or bellows extends at an oblique angle to the axial length of said tube.

7. A method as set forth in claim 1 including using said abutting ridges both to control the final spacing of the gripping dies and to form the exterior of flange or bellows.

8. A method for forming a flange or bellows in a plastic tube comprising:
inserting a mandrel inside a plastic tube;
gripping said tube with at least two gripping dies, said gripping dies initially being spaced apart;
heating the tube between the two gripping dies until the wall portion of said tube between said gripping dies is foldable,
placing a spacer between the gripping dies to control the spacing thereof; and
moving said gripping dies relatively toward each other so as to cause the tube wall portion therebetween to compress to form such bellows, the outward bulging tube wall portion being shaped into a bellows by such spacer.

9. A method of forming a bellows in a plastic tube comprising:
inserting a mandrel inside a plastic tube;
gripping the tube with at least two gripping dies, the gripping dies being initially spaced apart;
heating the tube between the two gripping dies until the wall portion of the tube between the gripping dies is foldable;
placing a spacer between the gripping dies; and
forming the tubing by moving the gripping dies relatively toward each other to bring the gripping dies into contact with the spacer and to bring the tubing into contact with the interior of the spacer.

10. The method of claim 9 further including the step of selecting a spacer with a thickness sufficient to prevent facing walls of the folded portion of thetubing from being pressed into bonding contact with each other.

11. The method of claim 9 wherein the step of inserting a mandrel includes inserting a mandrel of uniform cross section.

12. The method of claim 9 wherein the step of forming the tubing includes causing the tube wall portion between the gripping dies to bulge outward from the mandrel.

13. The method of claim 12 wherein the step of inserting a mandrel includes the step of inserting a mandrel with internal venting passages, and the step of causing the tube wall portion between the gripping dies to bulge includes the step of permitting air to flow through the vent passages in the mandrel in and out of the space between the bulge and the mandrel and the atmosphere.

14. The method of claim 13 wherein the step of inserting a mandrel includes the step of inserting a mandrel with a uniform cross section.

15. A method for forming a flange or bellows in a plastic tube comprising:
inserting a mandrel inside a plastic tube;
gripping said tube with at least two gripping dies, said gripping dies initially spaced apart;
heating the tube between the two gripping dies until the wall portion of said tube between said gripping dies is foldable;
moving said gripping dies relatively toward each other to form such flange or bellows;
controlling the heating and the extent of movement of said gripping dies so as to avoid the interior walls of the flange or bellows from sticking to each other; and
providing the gripping dies with opposed annular ridges which are adapted to abut when the dies are moved toward each other.

16. A method of forming a bellows in a plastic tube comprising:
inserting a mandrel with a uniform cross section and with internal vent passages inside a plastic tube;
gripping the tube with at least two gripping dies, the gripping dies being initially spaced apart;
heating the tube between the two gripping dies until the wall portion of the tube between the gripping dies is foldable;
placing a spacer between the gripping dies; and
forming the tubing by moving the gripping dies relatively toward each other to bring the gripping dies into contact with the spacer and to cause the tube wall portion between the gripping dies to bulge outward from the mandrel and to fold to bring the tubing into contact with the interior of the spacer, air being permitted to flow through the vent passages in the mandrel in and out of the space between the bulge and the mandrel and the atmosphere.

17. A method of forming a bellows in a plastic tube comprising:
inserting a mandrel inside a plastic tube;
gripping the tube with at least two gripping dies, the gripping dies being initially spaced apart;
heating the tube between the two gripping dies until the wall portion of the tube between the gripping dies is foldable;
placing a spacer between the gripping dies; and
forming the tubing by moving the gripping dies relatively toward each other to bring the gripping dies into contact with the spacer causing the tube wall portion between the gripping dies to bulge outward from the mandrel and to fold to bring the tubing into contact with the interior of the spacer.

* * * * *

UNITED STATES PATENT AND TRADEMARK OFFICE
CERTIFICATE OF CORRECTION

PATENT NO. : 4,803,033
DATED : February 7, 1989
INVENTOR(S) : William W. Rowley

It is certified that error appears in the above-identified patent and that said Letters Patent is hereby corrected as shown below:

Title page, item [54] should read as follows:

--METHOD OF FORMING A FLANGE OR BELLOWS IN A PLASTIC TUBE--

Signed and Sealed this

Second Day of May, 1989

Attest:

DONALD J. QUIGG

Attesting Officer

Commissioner of Patents and Trademarks